R. PROSE.
DRAFT EQUALIZER.
APPLICATION FILED MAY 15, 1911.
1,012,435.
Patented Dec. 19, 1911.
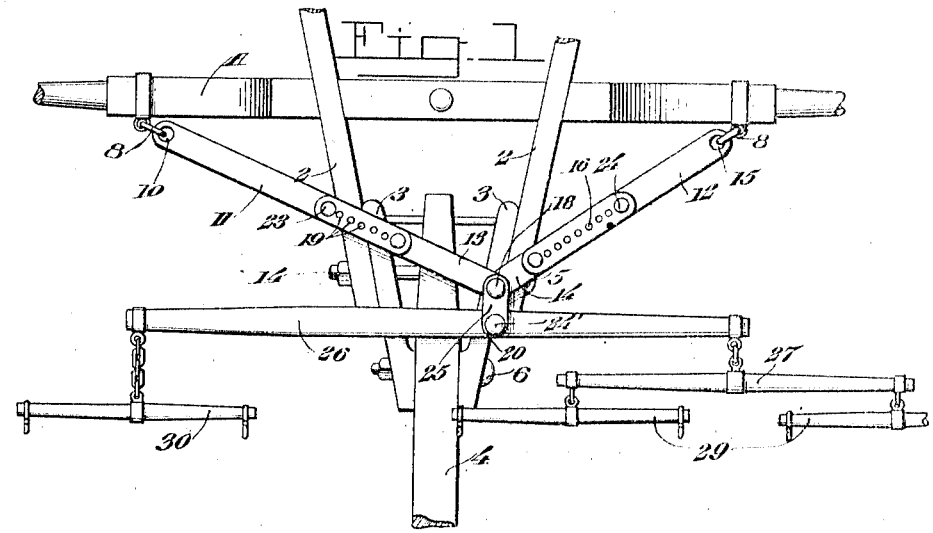
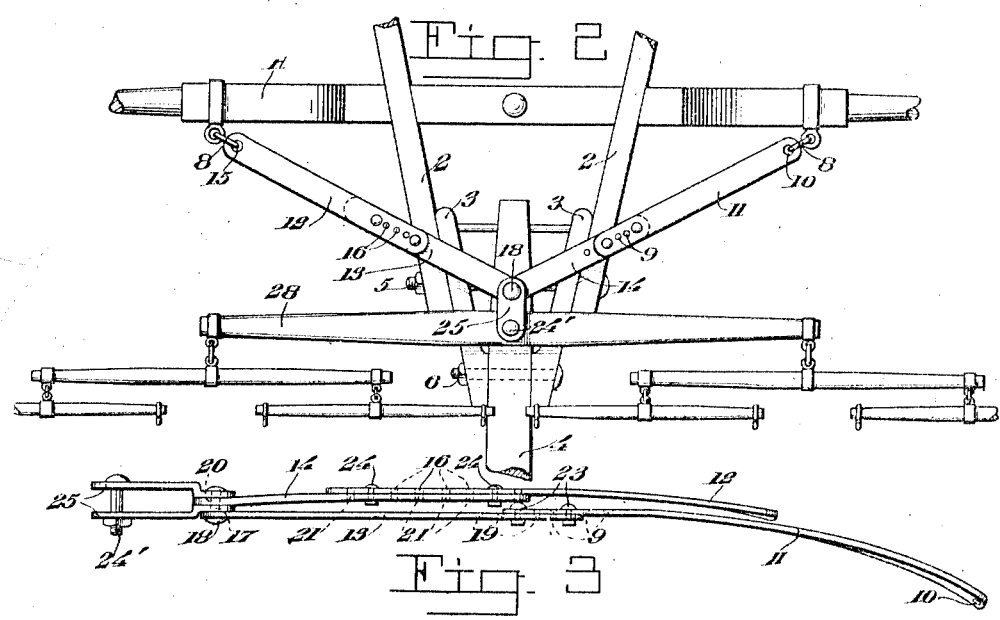
Witnesses
All. Gardes
A. L. Farnham
Inventor
Ray Prose
By Geo. W. Suco.
Attorney

UNITED STATES PATENT OFFICE.

RAY PROSE, OF ALAMOTA, KANSAS.

DRAFT-EQUALIZER.

1,012,435.  Specification of Letters Patent.  Patented Dec. 19, 1911.

Application filed May 15, 1911. Serial No. 627,268.

*To all whom it may concern:*

Be it known that I, RAY PROSE, a citizen of the United States, and a resident of Alamota, in the county of Lane and State of Kansas, have invented certain new and useful Improvements in Draft-Equalizers, of which the following is a specification, reference being had to the accompanying drawings.
This invention relates to certain new and useful improvements in draft equalizers.

The primary object of my invention is to provide a three horse evener which can be easily changed into a four horse equalizer.
Another object is to provide a draft equalizer arranged to be secured to the stay chain hooks fixed to the front axle of a vehicle, the evener being carried upon the tongue hounds of the vehicle.
A further object is to provide a convertible draft evener which can be compactly folded when not in use.

With these and other objects in view the present invention consists in the combination and arrangement of parts as will be hereinafter more fully described and finally pointed out in the appended claim, it being further understood that changes in the specific structure shown and described may be made within the scope of the claim, without departing from the spirit of the invention.

In the accompanying drawings forming a part of this specification, and in which like numerals of reference indicate similar parts in the several views: Figure 1, shows a top view of an equalizer embodying my invention arranged as a three horse evener. Fig. 2, shows the equalizer arranged as a four horse evener, and Fig. 3, is an edge view of the evener in its folded condition.

In my present invention I provide an equalizer, to be used in connection with vehicles and farm implements drawn by animals, arranged so that the same can be readily used as a three horse evener, or where a four horse hitch is required, insuring the draft being equally distributed without any side draft.
In the drawings A, represents the front axle of a vehicle, 2, the hounds, 3, the tongue braces, and 4, the tongue. The usual securing bolt 5, and hound bolt 6, are used. The axle A, is shown as being provided with the stay chain hooks 8, as is usual in connection with vehicles constructed to carry heavy loads, these stay chain hooks being secured by means of clips as is usual in the art.

My evener includes a main draft bar 11, having a hook eye 10, at one end and a series of bolt openings 9, at the opposite end and an auxiliary draft bar 12, with the hook eye 15, at one end and the bolt openings 16, at the opposite end. In connection with these draft bars I use two clevis bars, the main clevis bar 13, having a bolt eye 17, at one end arranged to removably receive the clevis bolt 18, and the bolt openings 19, at the opposite end; and an auxiliary clevis bar 14, also having a bolt eye 20, at one end to receive the clevis bolt 18, and a series of bolt openings 21, at the opposite end.

As shown in Fig. 3, the auxiliary draft bar 12, is shorter than the main draft bar 11, but longer than the auxiliary clevis bar 13, and this bar 13, in turn is longer than the auxiliary draft bar 14. When arranged as a three horse equalizer suitable bolts 23, as shown in Fig. 1, are used to connect the bar 13, to the bar 11, while the bolts 24, are employed to connect bar 14, to the bar 12.

Pivotally held to the bolt 18, are the two similar clevis yokes 25, carrying the bolt 24', arranged to receive the triple tree 26, when the device is used as a three horse evener. When used in making a four horse hitch, a long tree 28, is used as shown in Fig. 2.

As disclosed in Fig. 1, a double tree 27, is secured to the short end of the triple tree 25, this double tree carrying the two swingle trees 29, and the longer end of the triple tree 25, carrying the swingle tree 30.

As shown the evener members as well as the triple tree, are carried upon the tongue and tongue hounds.

Owing to the number of bolt openings used a nice adjustment may be obtained in that the evener can be lengthened or shortened to provide an adjustment whereby the triple may be adjustably held in relation to the axle A.

Where the equalizer is used in making a four horse hitch, the shortest member 14, is secured to the longest member 11, while the members 12 and 13, are connected, so that the clevis bolt 16, is brought squarely over the tongue as is shown in Fig. 2.

In order that the evener may be properly held on the hounds, the two draft bars 11 and 12, are slightly curved at one end, as shown more clearly in Fig. 3.

From the foregoing it will be understood that my equalizer includes four bars, which are adjustably and interchangeably connected, so that the equalizer may be used in connection with three or four horses. The equalizer is simple, and inexpensive in construction and both durable and efficient in operation and the adjustment of the several bars may be easily made, while the equalizer may be changed from a three, into a four horse equalizer with ease, accuracy and despatch.

Having thus described my said invention, what I claim as new and desire to secure by United States Letters Patent is:

A convertible three horse equalizer having in combination, a main draft bar with a hook eye at one end the opposite end having a series of bolt openings, an auxiliary draft bar with a hook eye at one end and a series of bolt openings at the opposite end, said auxiliary bar being of a length less than said main bar, a main clevis bar having a bolt eye at one end and a series of bolt openings at the remaining end, said main clevis being of a length less than said auxiliary draft bar, an auxiliary clevis bar having a bolt eye at one end and a series of bolt openings at the other, said auxiliary clevis bar being of a length less than main clevis bar, bolts to adjustably connect said main draft bar to said main clevis bar, bolts to adjustably connect said auxiliary draft bar to said auxiliary clevis bar, a clevis bolt within the bolt eyes of said auxiliary bars, and two similar clevis yokes pivotally carried upon said clevis bolt, all arranged substantially as and for the purpose set forth.

In testimony whereof I affix my signature, in presence of two witnesses.

RAY PROSE.

Witnesses:
W. S. FREAS,
BESSIE YOUNG.